(12) United States Patent
Balasubramanian et al.

(10) Patent No.: US 9,170,790 B2
(45) Date of Patent: Oct. 27, 2015

(54) REPLACING ANNOTATED PROGRAM CODE IN A NETWORKED COMPUTING ENVIRONMENT

(71) Applicant: International Business Machines Corporation, Armonk, NY (US)

(72) Inventors: Swaminathan Balasubramanian, Troy, MI (US); Rick A. Hamilton, II, Charlottesville, VA (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 13/706,599

(22) Filed: Dec. 6, 2012

(65) Prior Publication Data

US 2014/0165029 A1    Jun. 12, 2014

(51) Int. Cl.
*G06F 9/44* (2006.01)
*G06F 9/45* (2006.01)
*G06F 11/34* (2006.01)

(52) U.S. Cl.
CPC .......... *G06F 8/443* (2013.01); *G06F 11/3466* (2013.01); *G06F 8/423* (2013.01); *G06F 11/3419* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 5,923,882 A | 7/1999 | Ho et al. | |
| 6,202,205 B1 | 3/2001 | Saboff et al. | |
| 6,460,178 B1 | 10/2002 | Chan et al. | |
| 7,243,346 B1 | 7/2007 | Seth et al. | |
| 7,657,881 B2 | 2/2010 | Nagendra et al. | |
| 7,672,753 B1 | 3/2010 | Rossi | |
| 7,886,285 B2 | 2/2011 | Asselin et al. | |
| 7,949,992 B2* | 5/2011 | Andreev et al. | 717/104 |
| 8,020,146 B2* | 9/2011 | Hudson, Jr. | 717/120 |
| 8,122,017 B1* | 2/2012 | Sung et al. | 707/723 |
| 8,359,574 B1* | 1/2013 | Bannur et al. | 717/120 |

(Continued)

OTHER PUBLICATIONS

Otavio Augusto Lazzarini Lemos, Sushil Bajracharya, Joel Ossher, Paulo Cesar Masiero, Cristina Lopes, "A test-driven approach to code search and its application to reuse of auxiliary functionality", 2010, Elsevier B.V., (Whole Document).*

(Continued)

*Primary Examiner* — Don Wong
*Assistant Examiner* — Roberto E Luna
(74) *Attorney, Agent, or Firm* — Noah Sharkan; Keohane & D'Alessandro PLLC; Madeline F. Schiesser

(57) ABSTRACT

An approach for replacing one program code library (or method(s) thereof) with another program code library (or method(s) thereof) during execution is provided. Specifically, an annotation (e.g., comprising a runtime optimization request and associated performance/measurement criteria) within a program code file will be detected, analyzed, and used to monitor/assess the performance of a running set of methods of the program code file or the like (e.g., a set of initial/original methods). As this is occurring, a set of substitute methods will be identified from a program code library (e.g., based on similarities to the original set of methods) and likewise monitored/assessed. Based on the monitored performance, one or more alternate method(s) may be substituted for the original method(s) in the program code file. Such a capability allows for methods to be evaluated during runtime, and for performance to be optimized by utilizing the highest performing methods.

22 Claims, 5 Drawing Sheets

(56) References Cited

U.S. PATENT DOCUMENTS

| | | | |
|---|---|---|---|
| 8,572,560 B2* | 10/2013 | Drissi et al. | 717/120 |
| 2003/0079215 A1* | 4/2003 | Hundt et al. | 717/164 |
| 2010/0023955 A1 | 1/2010 | Verbist | |
| 2010/0281459 A1* | 11/2010 | Betouin et al. | 717/106 |

OTHER PUBLICATIONS

Yunwen Ye et al., "Supporting Reuse by Delivering Task-Relevant and Personalized Information", May 2002, ICSE'02 (whole document).*

Samuel Guyet et al., "An Annotation Language for Optimizing Software Libraries", 2000, ACM, vol. 35 Issue1 (whole document).*

Maitland, J., "Keeping Control Isn't Easy", Chapter 4: Cloud-Based Infrastructure, SearchCloudComputing.com, 13 pages.

Mell, P. et al., "The NIST Definition of Cloud Computing", National Institute of Standards and Technology, Information Technology Laboratory, Vers. 15, Oct. 7, 2009, 2 pages.

Maitland, J., "Keeping Control Isn't Easy", Chapter 4: Cloud-Based Infrastructure, SearchCloudComputing.com, Publication Date: Oct. 2009, 13 pages.

* cited by examiner

REPLACING ANNOTATED PROGRAM CODE IN A NETWORKED COMPUTING ENVIRONMENT

TECHNICAL FIELD

Embodiments of the present invention relate to program code library searching and selection. Specifically, embodiments of the present invention relate to an approach for integrated development environment (IDE)-based program code library searching and selection in a networked computing environment (e.g., a cloud computing environment).

BACKGROUND OF THE INVENTION

A code repository is typically a searchable, categorized, and/or Internet-accessible location that users may access to browse, search, and download source or compiled library code. Uses of code repositories may include open source projects, proprietary development projects, and/or projects that create libraries for later use. A code annotation is a special form of syntactic metadata that can be added to source code. Classes, methods, variables, parameters, and/or code packages may be annotated. Unlike comments, annotations may be actionable in that they may be embedded in files generated by a compiler, and may be utilized by an execution environment to be retrievable at run-time. A code library is a collection of resources used to develop software. Such resources may include pre-written code and subroutines, classes, values, or type specifications. Code libraries may contain program code and/or data that provide services to independent programs. Such an implementation allows for program code and/or data to be shared and changed in a modular fashion. Micro benchmarks may not accurately predict real work performance, as the inputs to various library calls may be user driven and different than anticipated during development. Challenges may exist, however, in that existing approaches may not automatically replace one program code library with another program code library. That is, existing approaches typically rely on manual and/or disparate searching operations. Such approaches may be inefficient and/or less accurate.

SUMMARY

Embodiments of the present invention provide an approach for replacing one program code library (or method(s) thereof) with another program code library (or method(s) thereof) during program execution based on annotations and associated performance characteristics/criteria. Specifically, an annotation (e.g., comprising a runtime optimization request and associated performance/measurement criteria) within a program code file will be detected, analyzed, and used to monitor/assess the performance of a running set of methods of the program code file or the like (e.g., a set of initial/original methods). As this is occurring, a set of substitute methods will be identified from a program code library (e.g., based on similarities to the original set of methods) and likewise monitored/assessed. Based on the monitored performance, one or more alternate method(s) may be substituted for one or more of the original method(s) in the program code file. Such a capability allows for methods to be evaluated during runtime, and for performance to be optimized by utilizing the highest performing methods.

A first aspect of the present invention provides a computer-implemented method for replacing annotated program code in a networked computing environment, comprising: detecting an annotation in a program code file, the annotation comprising a runtime optimization request with a set of criteria for running the program code file; monitoring, responsive to detecting, at least one method in the program code file during runtime based on the set of criteria; identifying at least one substitute method for the at least one method, the at least one substitute method being identified from a program code library stored in a computer storage device; monitoring the at least one substitute method based on the set of criteria; and selecting, based on the monitoring of the at least one substitute method, a particular substitute method from the at least one substitute method for use in the program code file.

A second aspect of the present invention provides a system for replacing annotated program code in a networked computing environment in a networked computing environment, comprising: a memory medium comprising instructions; a bus coupled to the memory medium; and a processor coupled to the bus that when executing the instructions causes the system to: detect an annotation in a program code file, the annotation comprising a runtime optimization request with a set of criteria for running the program code file; monitor, responsive to detecting, at least one method in the program code file during runtime based on the set of criteria; identify at least one substitute method for the at least one method, the at least one substitute method being identified from a program code library stored in a computer storage device; monitor the at least one substitute method based on the set of criteria; and select, based on the monitoring of the at least one substitute method, a particular substitute method from the at least one substitute method for use in the program code file.

A third aspect of the present invention provides a computer program product for replacing annotated program code in a networked computing environment, the computer program product comprising a computer readable storage media, and program instructions stored on the computer readable storage media, to: detect an annotation in a program code file, the annotation comprising a runtime optimization request with a set of criteria for running the program code file; monitor, responsive to detecting, at least one method in the program code file during runtime based on the set of criteria; identify at least one substitute method for the at least one method, the at least one substitute method being identified from a program code library stored in a computer storage device; monitor the at least one substitute method based on the set of criteria; and select, based on the monitoring of the at least one substitute method, a particular substitute method from the at least one substitute method for use in the program code file.

A fourth aspect of the present invention provides a method for deploying a system for replacing annotated program code in a networked computing environment, comprising: providing a computer infrastructure being operable to: detect an annotation in a program code file, the annotation comprising a runtime optimization request with a set of criteria for running the program code file; monitor, responsive to detecting, at least one method in the program code file during runtime based on the set of criteria; identify at least one substitute method for the at least one method, the at least one substitute method being identified from a program code library stored in a computer storage device; monitor the at least one substitute method based on the set of criteria; and select, based on the monitoring of the at least one substitute method, a particular substitute method from the at least one substitute method for use in the program code file.

BRIEF DESCRIPTION OF THE DRAWINGS

These and other features of this invention will be more readily understood from the following detailed description of the various aspects of the invention taken in conjunction with the accompanying drawings in which.

Figure 1:
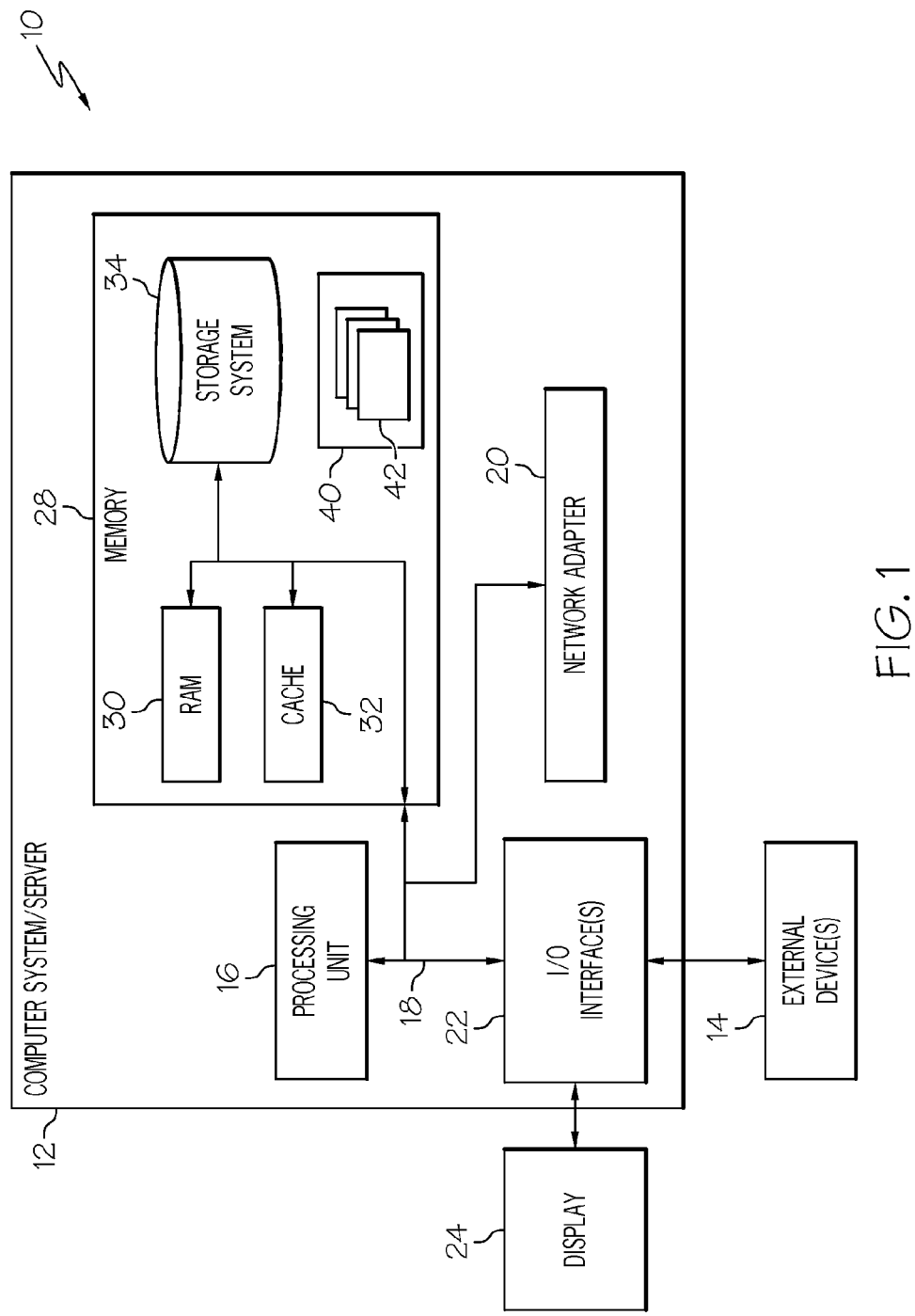
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for replacing one program code library (or method(s) thereof) with another program code library (or method(s) thereof) during program/library execution based on annotations and associated performance characteristics/criteria. Specifically, an annotation (e.g., comprising a runtime optimization request and associated performance/measurement criteria) within a program code file will be detected, analyzed, and used to monitor/assess the performance of a running set of methods of the program code file or the like (e.g., a set of initial/original methods). As this is occurring, a set of substitute methods will be identified from a program code library (e.g., based on similarities to the original set of methods) and likewise monitored/assessed. Based on the monitored performance, one or more alternate method(s) may be substituted for one or more of the original method(s) in the program code file. Such a capability allows for methods to be evaluated during runtime, and for performance to be optimized by utilizing the highest performing methods.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Annotated program code replacement program/utility 40, having a set (at least one) of program modules 42, may be stored in memory 28 by way of example, and not limitation, as well as an operating system, one or more application programs, other program modules, and program data. In general, annotated program code replacement 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
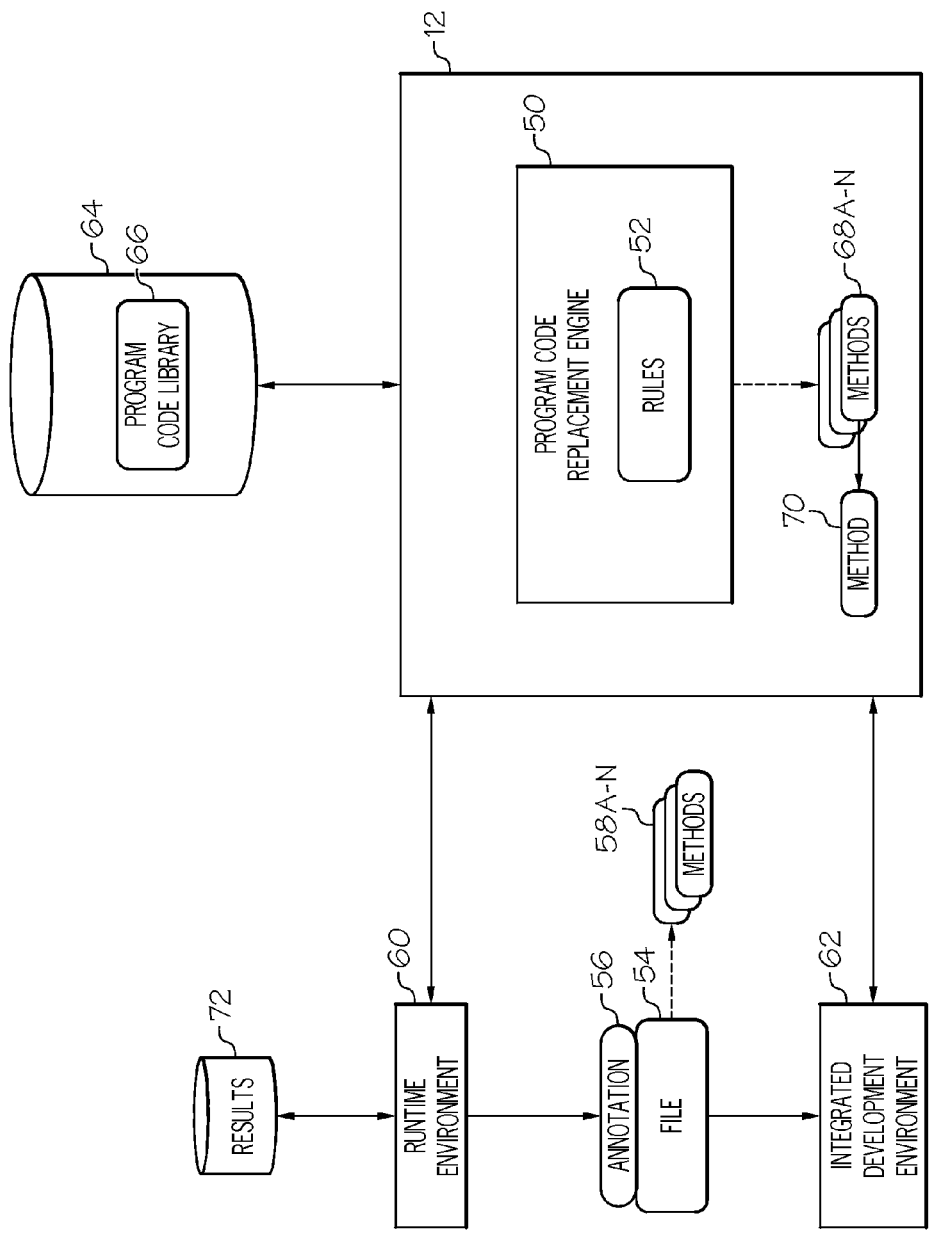
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment (e.g., a cloud computing environment), each client need not have a program code library searching and selection engine (engine 50). Rather, engine 50 could be loaded on a server (e.g., payment processing server) or server-capable device that communicates (e.g., wirelessly) with the clients to provide library searching and selection functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides library searching and selection functionality hereunder.

Along these lines, engine 50 may perform multiple functions similar to a general-purpose computer. Specifically, among other functions, engine 50 may (among other things): detect an (e.g., runtime) annotation 56 (e.g., being generated by a runtime environment 60) in a program code file 54, the annotation comprising a runtime optimization request with a set of criteria for running the program code file; analyze the annotation 56 in an integrated development environment (IDE) 62; monitor, responsive to detecting, at least one method 58A-N in the program code file 54 during runtime based on the set of criteria; identify at least one substitute method 68A-N for the at least one method 58A-N (e.g., the at least one substitute method 68A-N being identified from a program code library 66 stored in a computer storage device 64); monitor the at least one substitute method 68A-N based on the set of criteria; select, based on the monitoring of the at least one substitute method, a particular substitute method 70 from the at least one substitute method 68A-N for use in the program code file 54 (e.g., as a replacement for one or more of the original methods 58A-N; replace the at least one method 58A-N in the program code file with the particular substitute method 70; store the results of the monitoring operations in a repository 72.

It is understood that the example shown in FIG. 2 is intended to be illustrative only. For example, engine 50 could be loaded in runtime environment 60, IDE 62, or operate on a separate system 12 as shown that works in conjunction with runtime environment 60 and IDE 62. Regardless, it is understood that the specific architectural implementation shown in FIG. 2 is not intended to be limiting and that similar underlying functionality may be achieved with alternate architectures. For example, regardless of the specific architecture, a program code file having an annotation will be received and analyzed. Based on an optimization request and a set of performance/measurement criteria) associated with the file, a performance of a set of methods 58A-N will be monitored and a set of higher performing methods 68A-N may be substituted therefor.

Figure 3:
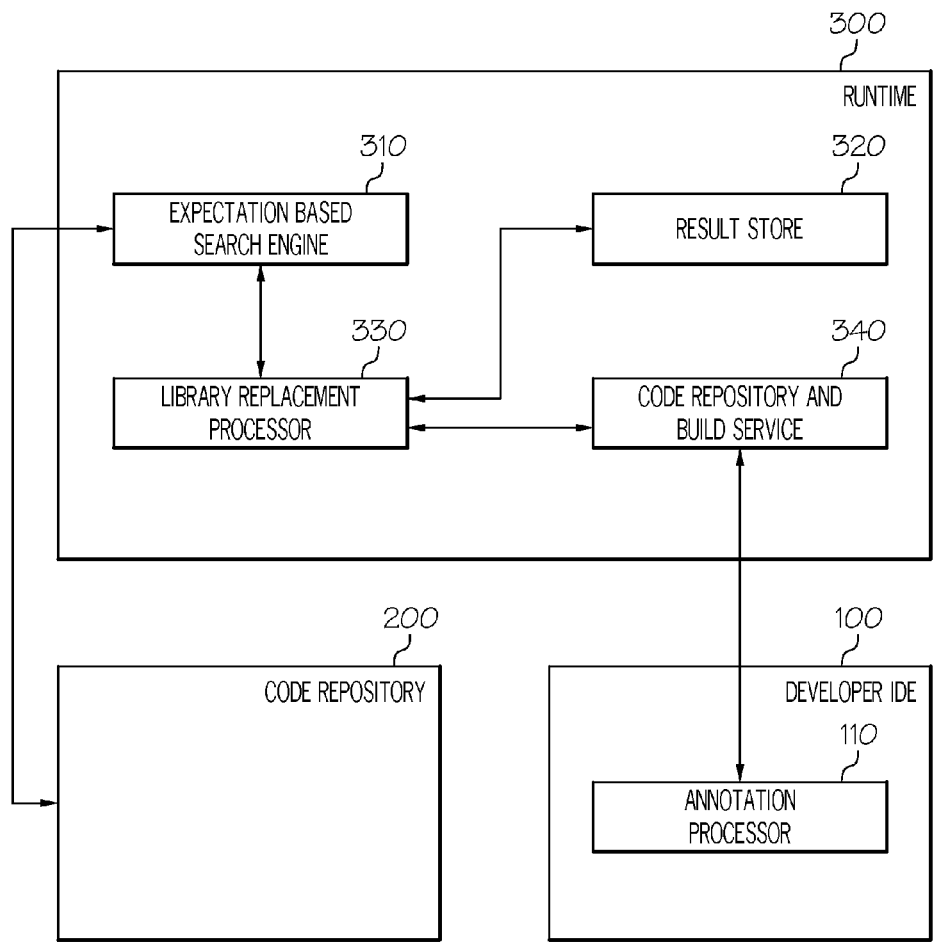
FIG. 3 depicts a more detailed diagram of the system of FIG. 2 according to an embodiment of the present invention.

Referring now to FIG. 3, a more detailed diagram of program 40 (FIG. 1) and/or engine 50 (FIG. 2) is shown. Specifically, FIG. 3 depicts program 40/engine 50 implemented via an IDE 100, code repository 200, and runtime 300. In one embodiment, components 100, 200, and 300 may be connected via one or more communications networks, such as a cloud computing network. Within IDE 100, annotation processor 110 may be configured to process a "@SameAs" and/or "@Substitute annotations." Annotation processor 110 may utilize expectation-based search engine 310 for all searches. Within runtime 300 are expectation-based search engine 310, result store 320, library replacement processor 330, and code repository and build service 340. Expectation-based search engine 310 may perform a search for libraries on code repository 200. Library replacement processor 330 may identify replacement/alternate libraries (e.g., via search and/or build) to replace runtime libraries with alternate libraries to select the library having the most optimal performance for the actual/real-world conditions of the application. Along these lines, library replacement processor 330 may interact with code repository and build service 340 and annotation processor 110. The results yielded by library replacement processor 330 may then be stored in result store 320. Code repository 200 is an illustrative repository used by expectation-based search engine 310 to perform expectation-based searches.

Illustrative Embodiment

This section will describe various functions (e.g., via method, functions and/or modules) performed by engine 50 according to an illustrative example hereunder.

Annotation Processing

Annotation Parsing: Under this method, a user may (for example) seek a library to perform a base 64 encoding of strings. For their application, the user may wish the return from the library call to also be a string. To initiate a search, the user may then enter the following into the code where the user wishes to make the library invocation:

@Description (base64,encode)
@Expect("hello").Returns("aGVsbG8=")
@Signature("public String <method> String")

The above set of instructions request the IDE to invoke a search of repositories for methods containing the terms base 64 and decode. For matching methods, the IDE may then narrow down methods that are public, return a string object and expect a single string object as a parameter. Furthermore, if that method is passed a string of "hello", the return value from that method should be a string of "aGVsbG8=". The user may then be presented a list of matching methods and the libraries from which those methods belong.

To enable runtime library replacement, the following annotation with optional argument may be used:

@RuntimeOptimize("@Time %>0.1")

This instructs the runtime environment when loading the class to monitor how the percentage of time is spent within this method call. If the percentage of time exceeds 0.1%, then the runtime environment should search for a more optimal library.

User Defined Library Selection

In another aspect of this approach, additional annotations may be added that enable the user to provide a list of ordered libraries to select from. The proposed annotation may be called LibraryOrder and may have the following signature:

@LibraryOrder("XYZCollections, ABCCollections,Java.util")

This instructs the runtime environment to the collections library first, measure its performance, then use Jakarta collection, measure its performance, etc.

Result Store

In another aspect of this approach, if the library call is marked for potential optimization, the runtime environment may begin storing a subset of the method invocation parameters and resulting returns. This invocation parameter and result store may be used to automate input for related searching methodologies. By using a broad spectrum of "real world" parameters and results, a program code library may be replaced with relative certainty without a loss of functionality. In another embodiment, where incremental build along with automated deployment of code from a version control system is implemented, the runtime environment may augment user-defined annotations for expectations based search with data captured in the result store. Future searches may then make use of the invocation parameters and resulting returns from the store.

Library Search

In another aspect of this approach, various searching methodologies may be implemented to search for libraries matching the annotations provided. Matching libraries that are not explicitly excluded by other annotations are considered for replacement. This component may be invoked periodically during prolonged times of runtime inactivity as to not effect application performance. After the search is performed, the matching libraries are downloaded and scheduled for library replacement and performance timing.

Library Replacement

This method may replace runtime program code libraries (or methods) with alternate program code libraries (or methods) to select the fastest program code library (or method) for the conditions of the application. Replacement entails downloading a next program code library for inspection, modifying the execution paths to load that library and timing the resulting executions over a time period. After exhaustion of all matching program code libraries, the program code library with the best performance characteristics will be selected and used for all subsequent invocations. A change may be made directly to the binary to use the new program code library such that subsequent reloads of the application will use the new binary as well.

In an embodiment where automated deployment is connected to a version control system, the runtime environment may directly replace the library in the development branch. In an alternate embodiment, the runtime environment may flag the development branch for proposed replacement. The IDE may then present the proposal to the developer. The replacement may occur if a developer agrees with the proposal.

Figure 4:
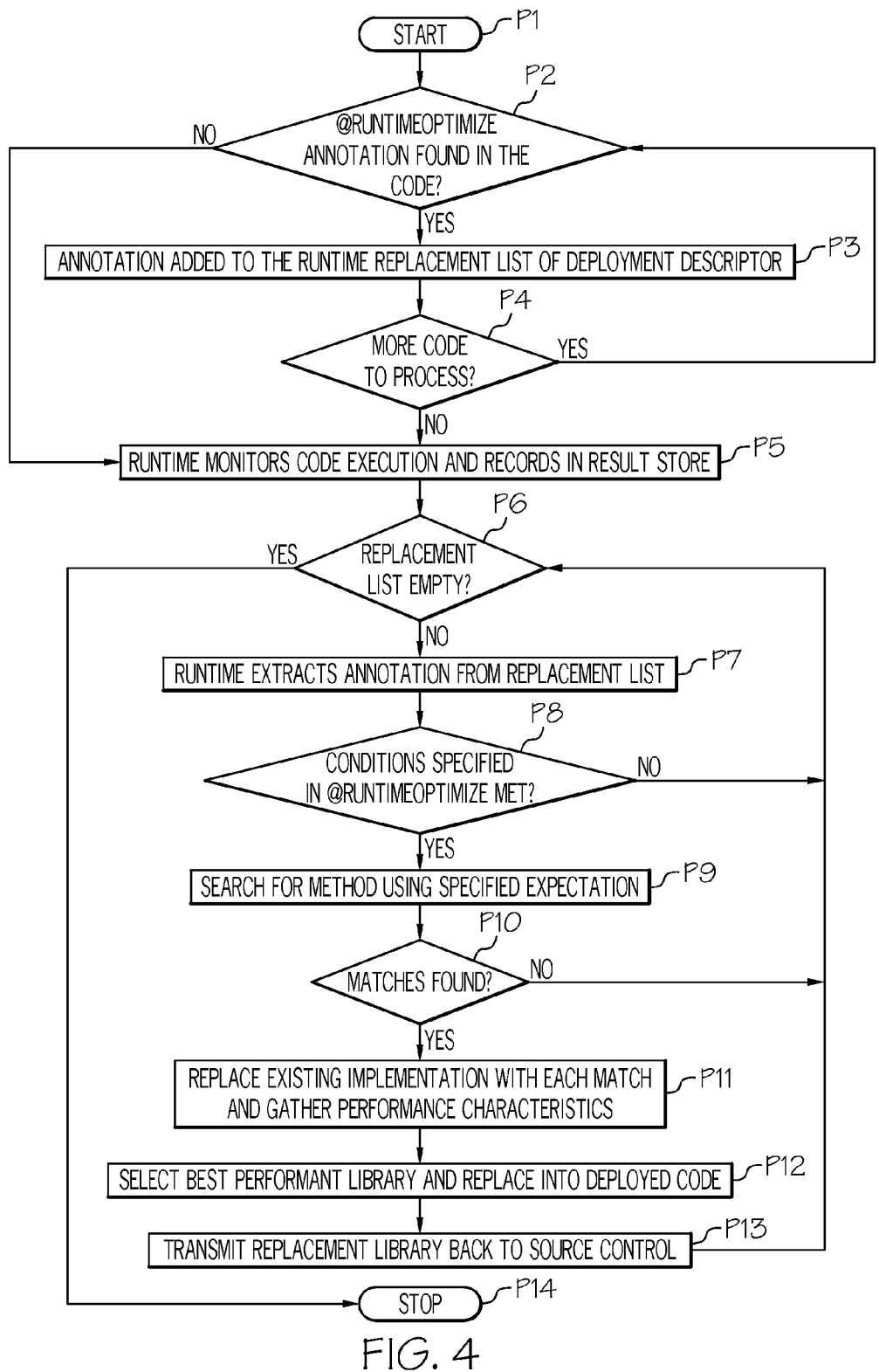
FIG. 4 depicts a method flow diagram according to an embodiment of the present invention.

Referring now to FIG. 4, a method flow diagram according to an embodiment of the present invention is shown. The process is started in step P1. In step P2, it is determined whether an optimization annotation is present in a received program code file. If not, the process may flow to step P5. If so, the annotation may be added to a runtime environment replacement list of deployment descriptors in step P3. In step P4, it is determined whether more code is present to process. If so, the process returns to step P2. If not, the runtime environment monitors code execution and records the results in a result store in step P5. In step P6, it is determined if the replacement list is empty. If so, the process may end in step P14. If not, the runtime environment extracts an annotation from the replacement list in step P7, and in step P8 it is determined whether conditions specified in the annotation (e.g., @RuntimeOptimize request) are met. If not, the process may flow to step P13. If so, a search will be conducted for an applicable method that meets the conditions in step P9. Then, in step P10, it will be determined if a match has been found. If not, the process flows to step P13. If so, an existing implementation will be replaced with each match, and performance characteristics therefor will be gathered/collected in step P11. In step P12, a best performing library/method will be selected and utilized in the deployed program code file. In step P13, the replacement library may be transmitted back to a source control destination and/or stored before the process is ended in step P14.

Figure 5:
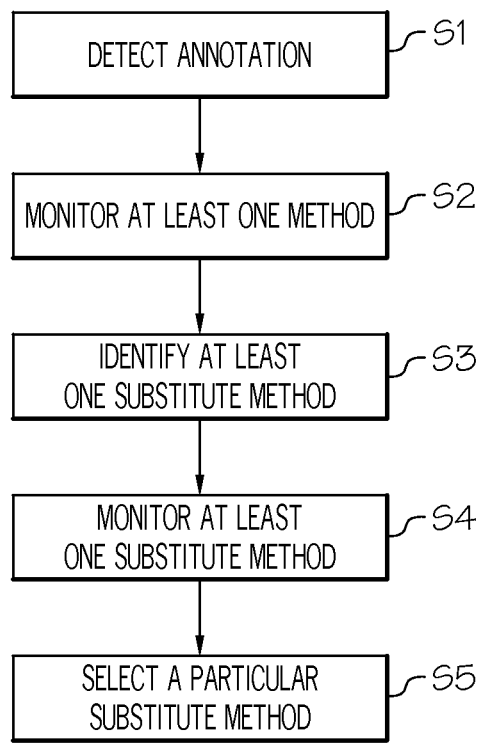
FIG. 5 depicts another method flow diagram according to an embodiment of the present invention.

Referring now to FIG. 5, another method flow diagram according to an embodiment of the present invention is shown (e.g., as enabled by engine 50 of FIG. 2). As depicted, in step S1, an annotation is detected in a program code file. As indicated above, the annotation comprises a runtime optimization request with a set of criteria for running the program code file. In step S2, at least one method in the program code file is monitored during runtime based on the set of criteria. In step S3, at least one substitute method for the at least one method is identified. The at least one substitute method is typically identified from a program code library stored in a computer storage device. In step S4, the at least one substitute method is monitored based on the set of criteria. In step S5, a particular substitute method is selected from the at least one substitute method for use in the program code file (e.g., as an alternative one or more of the original methods of the program code file).

While shown and described herein as an annotated program code replacement solution, it is understood that the invention further provides various alternative embodiments. For example, in one embodiment, the invention provides a computer-readable/useable medium that includes computer program code to enable a computer infrastructure to provide annotated program code replacement as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide annotated program code replacement functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for annotated program code replacement. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for replacing annotated program code in a networked computing environment, comprising:
 detecting an annotation in a program code file, the annotation comprising a runtime optimization request with a set of criteria for running the program code file;
 monitoring, responsive to detecting, at least one method in the program code file during runtime based on the set of criteria;
 identifying at least one substitute program code library based on at least one of: an annotation in a program code file, a selection provided by a user, and a results store, the at least one substitute library being identified from a code repository and stored in a computer storage device;
 identifying at least one substitute method for the at least one method, the at least one substitute method being identified from the at least one substitute program code library stored in a computer storage device;
 monitoring the at least one substitute method based on the set of criteria during runtime; and
 selecting, based on the monitoring of the at least one substitute method, a particular substitute method which best satisfies the criteria of the optimization request from the at least one substitute method for use in the program code file and a particular substitute program code library from the at least one substitute program code library.

2. The computer-implemented method of claim 1, the annotation comprising a runtime annotation.

3. The computer-implemented method of claim 2, the runtime annotation being generated by a runtime environment.

4. The computer-implemented method of claim 1, further comprising replacing the at least one method in the program code file with the particular substitute method and replacing a program code library with the particular substitute program code library during runtime.

5. The computer-implemented method of claim 4, further comprising storing the program code file after the replacing.

6. The computer-implemented method of claim 1, further comprising analyzing the annotation in an integrated development environment (IDE).

7. The computer-implemented method of claim 1, the networked computing environment comprising a cloud computing environment.

8. A system for replacing annotated program code in a networked computing environment in a networked computing environment, comprising:
   a memory medium comprising instructions;
   a bus coupled to the memory medium; and
   a processor coupled to the bus that when executing the instructions causes the system to:
      detect an annotation in a program code file, the annotation comprising a runtime optimization request with a set of criteria for running the program code file;
      monitor, responsive to detecting, at least one method in the program code file during runtime based on the set of criteria;
      identify at least one substitute program code library based on at least one of: an annotation in a program code file, a selection provided by a user, and a results store, the at least one substitute library being identified from a code repository and stored in a computer storage device;
      identify at least one substitute method for the at least one method, the at least one substitute method being identified from the at least one substitute program code library stored in a computer storage device;
      monitor the at least one substitute method based on the set of criteria during runtime; and
      select, based on the monitoring of the at least one substitute method which best satisfies the criteria of the optimization request, a particular substitute method from the at least one substitute method for use in the program code file and a particular substitute program code library from the at least one substitute program code library.

9. The system of claim 8, the annotation comprising a runtime annotation.

10. The system of claim 9, the runtime annotation being generated by a runtime environment.

11. The system of claim 8, the memory medium further comprising instructions for causing the system to replace the at least one method in the program code file with the particular substitute method and to replace a program code library with the particular substitute program code library during runtime.

12. The system of claim 11, the memory medium further comprising instructions for causing the system to store the program code file after the replacing.

13. The system of claim 8, the memory medium further comprising instructions for causing the system to analyze the annotation in an integrated development environment (IDE).

14. The system of claim 8, the networked computing environment comprising a cloud computing environment.

15. A computer program product for replacing annotated program code in a networked computing environment, the computer program product comprising a computer readable storage device, and program instructions stored on the computer readable storage device, to:
   detecting an annotation in a program code file, the annotation comprising a runtime optimization request with a set of criteria for running the program code file;
   monitoring, responsive to detecting, at least one method in the program code file during runtime based on the set of criteria;
   identifying at least one substitute program code library based on at least one of: an annotation in a program code file, a selection provided by a user, and a results store, the at least one substitute library being identified from a code repository and stored in a computer storage device;
   identifying at least one substitute method for the at least one method, the at least one substitute method being identified from the at least one substitute program code library stored in a computer storage device;
   monitoring the at least one substitute method based on the set of criteria during runtime; and
   selecting, based on the monitoring of the at least one substitute method, a particular substitute method which best satisfies the criteria of the optimization request from the at least one substitute method as an alternative to the at least one method and a particular substitute program code library from the at least one substitute program code library.

16. The computer of claim 15, the annotation comprising a runtime annotation.

17. The computer program product of claim 16, the runtime annotation being generated by a runtime environment.

18. The computer program product of claim 15, the computer readable storage device further comprising instructions to replace the at least one method in the program code file with the particular substitute method and to replace a program code library with the particular substitute program code library during runtime.

19. The computer program product of claim 18, the computer readable storage media further comprising instructions to store the program code file after the replacing.

20. The computer program product of claim 15, the computer readable storage media further comprising instructions to analyze the annotation in an integrated development environment (IDE).

21. The computer program product of claim 15, the networked computing environment comprising a cloud computing environment.

22. A method for deploying a system for replacing annotated program code in a networked computing environment, comprising:
   making available for use by another a computer infrastructure having at least one computer device that operates to:
      detect an annotation in a program code file, the annotation comprising a runtime optimization request with a set of criteria for running the program code file;
      monitor, responsive to detecting, at least one method in the program code file during runtime based on the set of criteria;
      identifying at least one substitute program code library based on at least one of: an annotation in a program code file, a selection provided by a user, and a results store, the at least one substitute library being identified from a code repository and stored in a computer storage device;

identify at least one substitute method for the at least one method, the at least one substitute method being identified from the at least one substitute program code library-stored in a computer storage device;

monitor the at least one substitute method based on the set of criteria during runtime; and select, based on the monitoring of the at least one substitute method, a particular substitute method which best satisfies the criteria of the optimization request from the at least one substitute method for use in the program code file and a particular substitute program code library from the at least one substitute program code library.

* * * * *